(12) United States Patent
Wei-Yi et al.

(10) Patent No.: US 12,468,368 B2
(45) Date of Patent: Nov. 11, 2025

(54) POWER CONTROL IN A COMPUTING DEVICE

(71) Applicant: Toshiba Global Commerce Solutions, Inc., Durham, NC (US)

(72) Inventors: Hsuan Wei-Yi, Taipei (TW); Yi-Hsin Huang, Taipei (TW); Ying-Chi Chou, Chiayi (TW); Wen-Fu Tsai, New Taipei (TW)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 37 days.

(21) Appl. No.: 18/097,359

(22) Filed: Jan. 16, 2023

(65) Prior Publication Data

US 2024/0241560 A1 Jul. 18, 2024

(51) Int. Cl.
*G06F 1/30* (2006.01)

(52) U.S. Cl.
CPC .................................. *G06F 1/305* (2013.01)

(58) Field of Classification Search
CPC ...... G06F 1/305; G06F 1/3234; G06F 1/3209; G06F 1/3287; G06F 1/3296
See application file for complete search history.

(56) References Cited

U.S. PATENT DOCUMENTS

| | | | | | |
|---|---|---|---|---|---|
| 2002/0062416 | A1* | 5/2002 | Kim | ...................... | G06F 1/3253 |
| | | | | | 710/305 |
| 2004/0059805 | A1* | 3/2004 | Dinker | ................ | G06F 11/2069 |
| | | | | | 709/201 |
| 2004/0064755 | A1* | 4/2004 | Therien | ................... | G06F 1/325 |
| | | | | | 714/10 |
| 2005/0239518 | A1* | 10/2005 | D'Agostino | .......... | G06F 1/3287 |
| | | | | | 455/574 |
| 2009/0249112 | A1* | 10/2009 | Diab | ....................... | H04L 12/10 |
| | | | | | 713/300 |
| 2010/0131790 | A1* | 5/2010 | Zhang | .................... | G06F 1/3287 |
| | | | | | 713/340 |
| 2011/0239020 | A1* | 9/2011 | Thomas | ................ | G06F 9/5094 |
| | | | | | 713/323 |
| 2019/0028330 | A1* | 1/2019 | Wilson | ..................... | H04L 43/08 |
| 2019/0086979 | A1* | 3/2019 | Kao | ........................ | G06F 9/4416 |
| 2019/0121410 | A1* | 4/2019 | Chan | ....................... | H04L 12/12 |
| 2020/0310933 | A1* | 10/2020 | Zhu | ...................... | G06F 11/0784 |

OTHER PUBLICATIONS

Tech Advisor, "The best smart plug 2022", Apr. 8, 2022, pp. 1-17, retrieved on Oct. 12, 2022, retrieved from internet: https://www.techadvisor.com/article/723860/best-smart-plug.html.

Perle, "Remote Power Switches", pp. 1-2, retrieved on Oct. 12, 2022, retrieved from internet: https://www.perle.com/products/remote-power-switch.shtml.

(Continued)

*Primary Examiner* — Hyun Soo Kim
(74) *Attorney, Agent, or Firm* — COATS & BENNETT, PLLC

(57) ABSTRACT

A computing device permits distribution of power received from an external power source to one or more subsystems of the computing device. The computing device receives input requesting a power control operation and, responsive to the input, interrupts the distribution of the power to at least one of the subsystems.

13 Claims, 4 Drawing Sheets

(56) References Cited

OTHER PUBLICATIONS

DPS Telecom, "Remote Power Switch (AC): How to Remote Control Power", pp. 1-4, retrieved on Oct. 12, 2022, retrieved from internet: https://www.dpstele.com/power-distribution-unit/remote-power-switch.php.

Electronics Hub, "PWM Based AC Power Control using MOSFET/IGBT", Nov. 27, 2015, pp. 1-11, retrieved on Oct. 12, 2022, retrieved from internet: https://www.electrnoicshub.org/pwm-based-ac-power-control-using-mosfet-igbt/.

SparkFun, "SparkFun MOSFET Power Controller", pp. 1-10, retrieved on Oct. 12, 2022, retrieved from internet: https://www.sparkfun.com/products/11214.

Ilett, J. "Practical MOSFET Tutorial #5—Microcontroller Interfacing", Sep. 27, 2013, pp. 1-4, retrieved on Oct. 22, 2022, retrieved from internet: https://www.youtube.com/watch?v=qSMKR7Enit8.

Embedded, "The role of MCUs and PSoCs in making home appliances smarter", Aug. 10, 2013, pp. 1-16, retrieved on Oct. 12, 2022, retrieved from internet: https://www.embedded.com/the-role-of-mcus-and-psocs-in-making-home-appliances-smarter/.

Electronics Tutorials, "MOSFET as a Switch", pp. 1-10, retrieved on Oct. 12, 2022, retrieved from internet: https://www.electronics-tutorials.ws/transistor/tran_7_html.

Forcetronics, "How to Use a MOSFET as a Switch", Jan. 25, 2015, pp. 1-3, retrieved on Oct. 12, 2022, retrieved from internet: https://www.youtube.com/watch?v=4xaPfY7r8qU.

Green, P. et al., "Gate drive for power MOSFETs in switching applications", Application Note, Version 1.0, Apr. 20, 2022, AN_2203_PL18_2204_004502, pp. 1-36, Infineon.

Electrical Engineering, "Using MOSFET to turn off the circuit", Sep. 21, 2019, pp. 1-2, retrieved on Oct. 12, 2022, retrieved from internet: https://electronics.stackexchange.com/questions/459640/using-mosfet-to-turn-off-the-circuit.

Lee, D., "Simple MOSFET gating delay scheme for SMPS start-up in the standby power reduction circuit", IET Power Electronics, vol. 11 Issue 1, Jan. 1, 2018, pp. 16-22, IET.

Eleccircuit, "Simple time Delay Circuit using MOSFET", Jun. 20, 2022, pp. 1-19, retrieved on Oct. 12, 2022, retrieved from internet: https://www.eleccircuit.com/off-on-after-delay-switch-by-mosfet/.

Toshiba, "MOSFET Gate Drive Circuit", Application Note, Jul. 26, 2018, pp. 1-22, Toshiba.

* cited by examiner

POWER CONTROL IN A COMPUTING DEVICE

BACKGROUND

Traditionally, when a computing device is referred to as being "off," this can mean a variety of different things. From a user's perspective, a computer that is "off" typically means that the computer is in a power state that is non-responsive to certain kinds of user input. However, the true state of the computer often cannot be discerned simply from knowing that the computer is "off." Because the term "off" is an imprecise umbrella term for a variety of different states in the field of computers, simply turning a computer "off" often does not have the intended or desired effect.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a subsystem 190, generally, as opposed to discussion of an individual instance of a subsystem 190a, 190b, 190c).

DETAILED DESCRIPTION

Turning a computer off typically involves pushing a physical power button on the device or instructing the computer's operating system to shut down. While this may result in the computer being non-responsive to at least a subset of user inputs, ceasing to present information on a display, and/or other notable reductions in functionality, the computer typically continues to receive alternating current (AC) power from a power source. Despite the computer ostensibly being off from the user's perspective, this AC power may nonetheless be distributed to one or more subsystems of the computer. Thus, turning the computer off does not necessarily cause the state of any individual subsystem to be changed. Accordingly, if a given subsystem is in an error state, powering the computer off and turning it back on may or may not restore proper operation of the subsystem.

In view of the above, embodiments of the present disclosure provide a mechanism for remotely controlling AC power to one or more subsystems of a computer device. In one example, this remote control enables the computing device to be remotely AC power cycled. Among other things, such embodiments may, for example, advantageously provide predictable control over the operational state of the one or more subsystems for which the AC power is being controlled.

Figure 1:
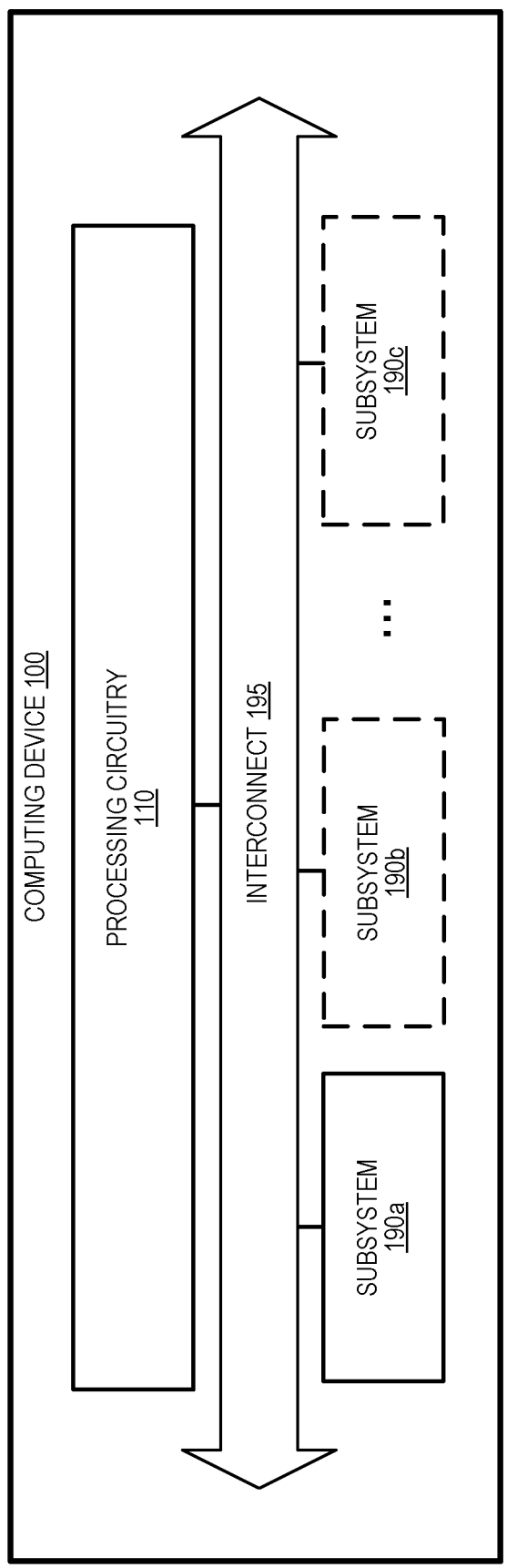
FIGS. 1-4 are schematic block diagrams illustrating different example computing devices according to different example embodiments of the present disclosure.

FIG. 1 is a schematic block diagram illustrating an example computing device 100. The computing device 100 may be a computer of any kind. For example, the computing device 100 may be a server, a server cluster, a personal computer, a laptop computer, a desktop computer, a workstation, a point-of-sale terminal, a smartphone, a tablet, a wearable computer, a smart appliance, network attached storage, or a storage area network, among other things.

The computing device 100 includes processing circuitry 110, an interconnect 195, and one or more subsystems 190. The processing circuitry 110 is electrically connected to the one or more subsystems 190 via the interconnect 195. The interconnect 195 comprises an electrical medium for carrying power to the one or more subsystems 190. For example, the interconnect 195 may comprise one or more power lines and/or buses. The interconnect 195 may additionally include one or more signaling paths for carrying communication signals. For example, the interconnect 195 may comprise one or more data lines and/or buses.

The processing circuitry 110 is configured to control power to the one or more subsystems 190 via the interconnect 195. For example, the computing device 100 may include subsystems 190a, 190b, and 190c, and the processing circuitry 110 may be configured to selectively control, for each of the subsystems 190a-c, whether or not the subsystem 190a-c receives power over the interconnect 195.

The processing circuitry 110 may include one or more microprocessors, microcontrollers, hardware circuits, discrete logic circuits, hardware registers, digital signal processors (DSPs), field-programmable gate arrays (FPGAs), Field-Effect Transistor (FET), application-specific integrated circuits (ASICs), or a combination thereof. In one example, the processing circuitry 110 comprises a metal-oxide-semiconductor FET (MOSFET) that cuts power to one or more of the subsystems 190 as desired. The processing circuitry 110 may, in some embodiments, include a line or pin for General Purpose Input/Output (GPIO) through which power control may be invoked. The subsystems 190 include subsystem-specific circuitry configured to perform the functions of their respective subsystems 190.

In some embodiments, to control power to the one or more subsystems 190, the processing circuitry 110 is configured to cycle power off and on. For example, the processing circuitry 110 may toggle the power off for an off duration and, after the off duration has expired, toggle the power on. In some embodiments, the power off duration is configurable. In other embodiments, the duration is static and predefined.

Figure 2:
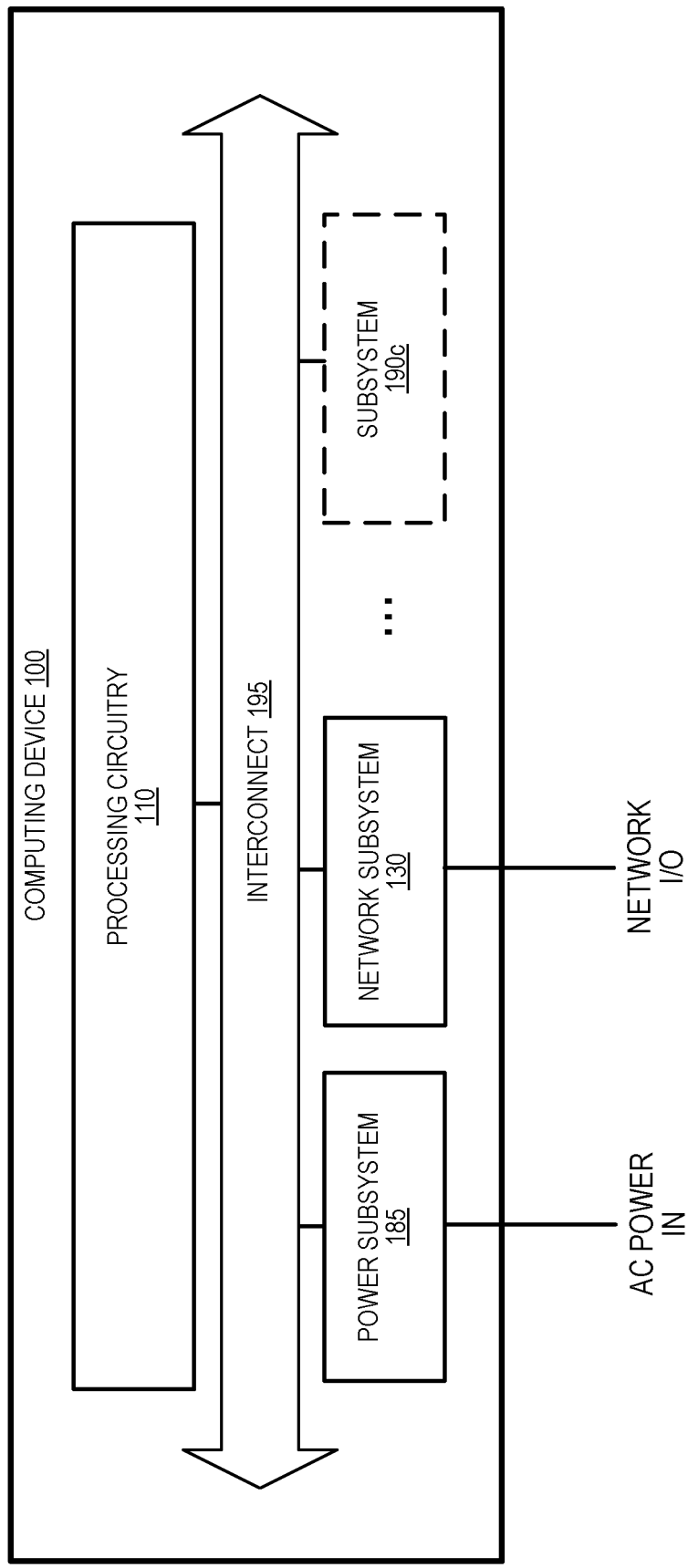

FIG. 2 is a schematic block diagram that illustrates an example computer device 100 that provides remote power control according to one or more embodiments of the present disclosure. In the example of FIG. 2, the computing device 100 comprises a power subsystem 185 configured to receive AC power from an external AC power source (e.g., a wall outlet, a battery) and distributes the received power to one or more other subsystems (e.g., subsystem 190c) via the interconnect 195. In this example, the computing device 100 further comprises a network subsystem 130 configured to exchange network input/output (I/O) with an external network (e.g., the Internet). The interconnect 195, in this example, supports the transmission of both power and data.

According to the example of FIG. 2, the processing circuitry 110 may receive a message via the network subsystem 130 invoking power control. In response, the processing circuitry 110 sends a power control signal to the power subsystem 185. In response to the power control signal, the power subsystem 185 stops distributing power to one or more of the other subsystems (e.g., the processing circuitry 110, the network subsystem 130, and/or the subsystem 190c).

The power subsystem 185 may be configured to restart power distribution after a power off duration. The power off duration may be indicated to the power subsystem 185, e.g., in the power control signal or previously in a separate configuration message. Alternatively, the power subsystem 185 may be configured to restart power distribution after a predefined period of time.

Figure 3:
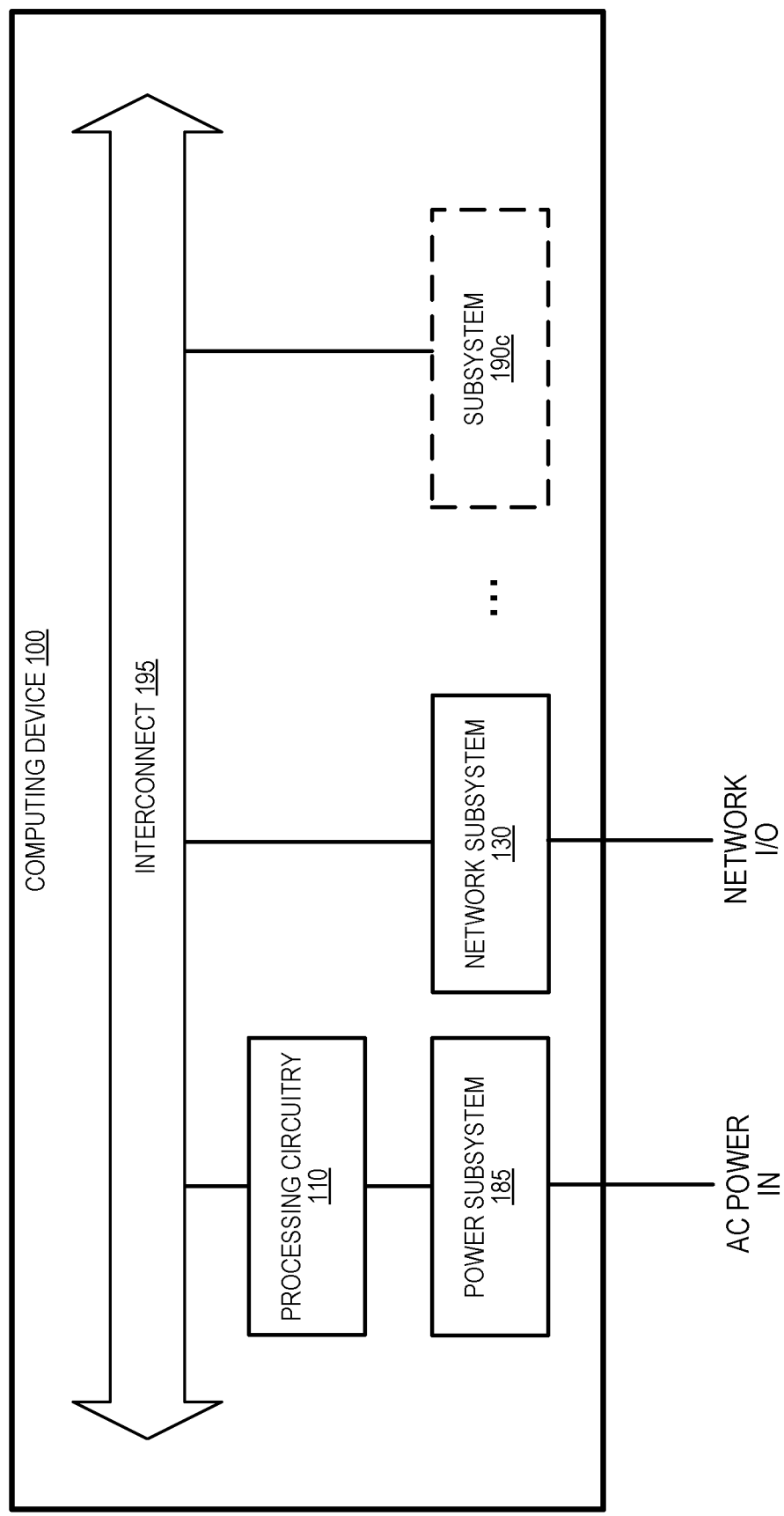

FIG. 3 is a schematic block diagram that illustrates another example computing device 100 that provides remote power control according to other embodiments of the present disclosure. In the example of FIG. 3, the computing device 100 may receive a message via the network subsystem 130 invoking power control. In response, the processing circuitry 110 interrupts the distribution of power to one or more other subsystems (e.g., the network subsystem 130 and/or the subsystem 190*c*).

In some embodiments, the processing circuitry 110 may be configured to stop interrupting power distribution after a power off duration. The power off duration may be indicated to the processing circuitry 110, e.g., in the message received from the network subsystem 130 or previously in a separate configuration message. Alternatively, the processing circuitry 110 may be configured to restore power distribution after a predefined period of time.

According to other embodiments, power control may be implemented in other ways. For example, in either of the example computing devices 100 illustrated in FIG. 2 or FIG. 3, the processing circuitry 110 may send a command to one or more subsystems 190 directing them to power down or restart themselves. Alternatively, power control may result in all subsystems 190 downstream from the point where power is interrupted losing power until power distribution is restored. That is, power control may be performed on a subsystem-by-subsystem basis, or may be performed without regard to particular subsystems 190, depending on the embodiment.

Further, although the previous examples discussed power control being invoked responsive to a message received from the network, other embodiments may perform discussed power control responsive to user input. For example, the processing circuitry 110 may perform power control responsive to a user selecting a power control option displayed on the screen. Such an option may be displayed in a menu presented by the Basic Input/Output System (BIOS) or Operating System (OS) of the computing device 100.

The subsystems 190 may take a variety of forms and are not limited to those described above. Other examples of subsystems include any number or combination of controllers, hubs, ports, memory modules, processors, transceivers, or other devices, e.g., supporting a Universal Serial Bus (USB), Ethernet, Radio Frequency (RF) communication, I2C, or other protocol, standard, or computing architecture.

Figure 4:
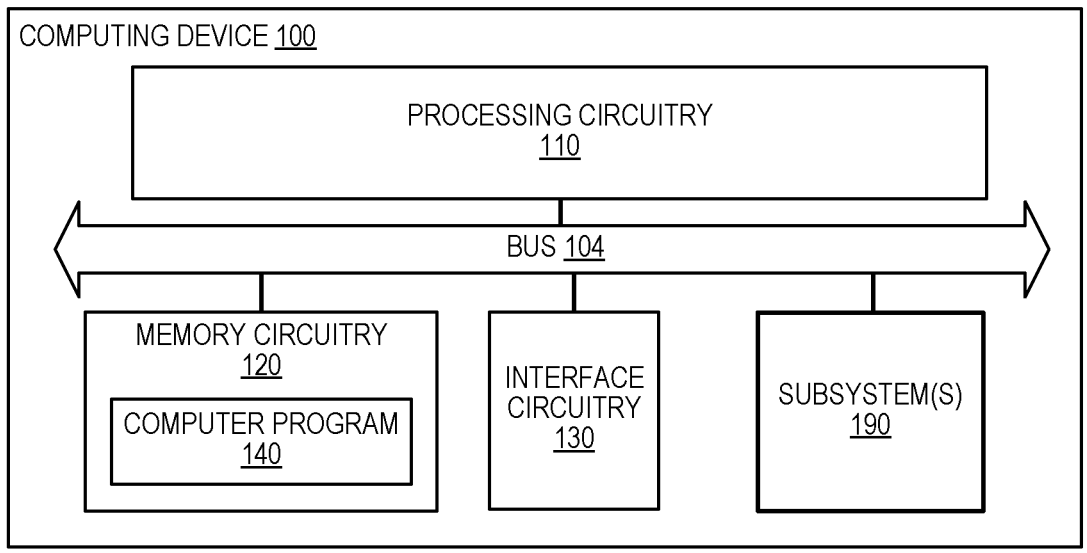

The processing circuitry 110 of various embodiments may be programmable hardware capable of executing software instructions of a machine-readable computer program 140 stored in memory circuitry 120 to which the processing circuitry 110 is communicatively connected (e.g., via a bus 104 or other interconnect), as shown in the example of FIG. 4. The memory circuitry 120 may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The processing circuitry 110 may also be communicatively connected to interface circuitry 130. The interface circuitry 130 may be a controller hub configured to control the input and output (I/O) data paths of the computing device 100. Such I/O data paths may include data paths for exchanging signals over a network (e.g., via Ethernet, Wi-Fi, BLUETOOTH, or the like) and/or interacting with a user (e.g., via a keyboard, mouse, display, touchscreen, or the like). The interface circuitry 130 may be implemented as a unitary physical component, or as a plurality of physical components that are contiguously or separately arranged, any of which may be communicatively coupled to any other or may communicate with any other via the processing circuitry 110.

Figure 5:
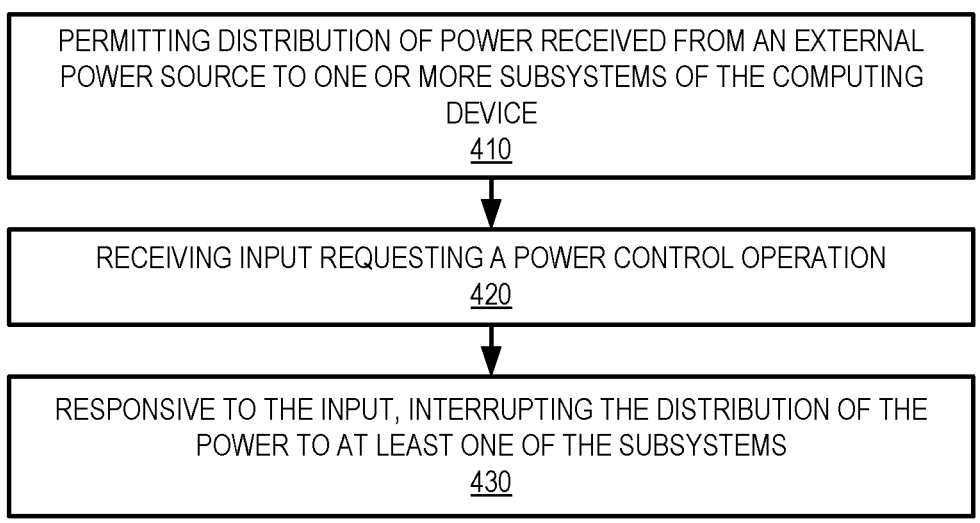
FIG. 5 is a flow diagram illustrating an example method according to one or more embodiments of the present disclosure.

The computing device 100 may be configured to perform any of the processing functions described herein. In one example, the computing device 100 is configured to perform the example method 400 illustrated in FIG. 5 (e.g., using processing circuitry 110 as previously discussed). The method 400 comprises permitting distribution of power received from an external power source to one or more subsystems 190 of the computing device 100 (block 410). The method 400 further comprises receiving input requesting a power control operation (block 420). The method 400 further comprises, responsive to the input, interrupting the distribution of the power to at least one of the subsystems 190 (block 430).

Correspondingly, in some embodiments, the processing circuitry 110 is configured to permit distribution of power received from an external power source to one or more subsystems 190 of the computing device 100. The processing circuitry 110 is further configured to receive input requesting a power control operation (e.g., via interface circuitry 130, via a network subsystem 130). The processing circuitry 110 is further configured to, responsive to the input, interrupt the distribution of the power to at least one of the subsystems 190.

Still other embodiments include a computer program 140 comprising instructions that, when executed on processing circuitry 110 of a computing device 100, cause the computing device 100 to carry out the method 400 described above.

Yet other embodiments include a carrier containing the computer program 140. The carrier is one of an electronic signal, optical signal, radio signal, or computer readable storage medium. Other embodiments may include other features without deviating substantially from the examples discussed above.

What is claimed is:

1. A method, implemented by a computing device, the method comprising:
   permitting distribution of power received from an external power source to one or more subsystems of the computing device;
   receiving, via user input at a display of the computing device, input requesting a power control operation, the input comprising a defined duration for powering off the one or more subsystems;
   responsive to the input, determining a point of power interruption between two or more downstream subsystems associated with the computing device;
   interrupting the distribution of the power to at least one of the subsystems in a failed operational state and two or more subsystems downstream from the point of power interruption; and
   restoring the distribution of the power of the subsystem to correct the failed operational state of the subsystem and the two or more subsystems downstream from the point of power interruption until power is restored.

2. The method of claim 1, wherein receiving the input requesting the power control operation comprises receiving user input at a Basic Input/Output System (BIOS) interface.

3. The method of claim 1, wherein receiving the input requesting the power control operation comprises receiving a request via a network interface.

4. The method of claim 1, wherein the requested power control operation comprises a power cycling request.

5. The method of claim 1, wherein:
interrupting the distribution of the power comprises interrupting the distribution of the power for the defined duration; and
restoring the distribution of the power in response to the defined duration elapsing.

6. The method of claim 1, wherein interrupting the distribution of the power to at least one of the subsystems comprises interrupting the distribution of the power to each of the subsystems.

7. A computing device comprising:
processing circuitry and one or more subsystems that are communicatively coupled to the processing circuitry, wherein the processing circuitry is configured to:
permit distribution of power received from an external power source to the one or more subsystems of the computing device;
receive, via user input at a display of the computing device, input requesting a power control operation, the input comprising a defined duration for powering off the one or more subsystems;
responsive to the input, determine a point of power interruption between two or more downstream subsystems associated with the computing device;
interrupt the distribution of the power to at least one of the subsystems in a failed operational state and two or more subsystems downstream from the point of power interruption; and
restore the distribution of the power of the subsystem to correct the failed operational state of the subsystem and the two or more subsystems downstream from the point of power interruption until power is restored.

8. The computing device of claim 7, wherein to receive the input requesting the power control operation, the processing circuitry is configured to receive user input at a Basic Input/Output System (BIOS) interface.

9. The computing device of claim 7, further comprising a network interface, wherein to receive the input requesting the power control operation, the processing circuitry is configured to receive a request via the network interface.

10. The computing device of claim 7, wherein the requested power control operation comprises a power cycling request.

11. The computing device of claim 7, wherein:
to interrupt the distribution of the power, the processing circuitry is configured to interrupt the distribution of the power for the defined duration; and
the processing circuitry is further configured to restore the distribution of the power in response to the defined duration elapsing.

12. The computing device of claim 7, wherein to interrupt the distribution of the power to at least one of the subsystems, the processing circuitry is configured to interrupt the distribution of the power to each of the subsystems.

13. A non-transitory computer readable medium storing a computer program for controlling a computing device, the computer program comprising software instructions that, when run on the processing circuitry of the computing device, cause the computing device to:
permit distribution of power received from an external power source to one or more subsystems of the computing device;
receive, via user input at a display of the computing device, input requesting a power control operation, the input comprising a defined duration for powering off the one or more subsystems;
responsive to the input, determining a point of power interruption between two or more downstream subsystems associated with the computing device;
interrupt the distribution of the power to at least one of the subsystems in a failed operational state and two or more subsystems downstream from the point of power interruption; and
restore the distribution of the power to the subsystem to correct the failed operational state of the subsystem and the two or more subsystems downstream from the point of power interruption until power is restored.

* * * * *